(No Model.)
F. PYRE.
DEVICE FOR SUPPORTING TOBACCO LATHS.
No. 461,274. Patented Oct. 13, 1891.
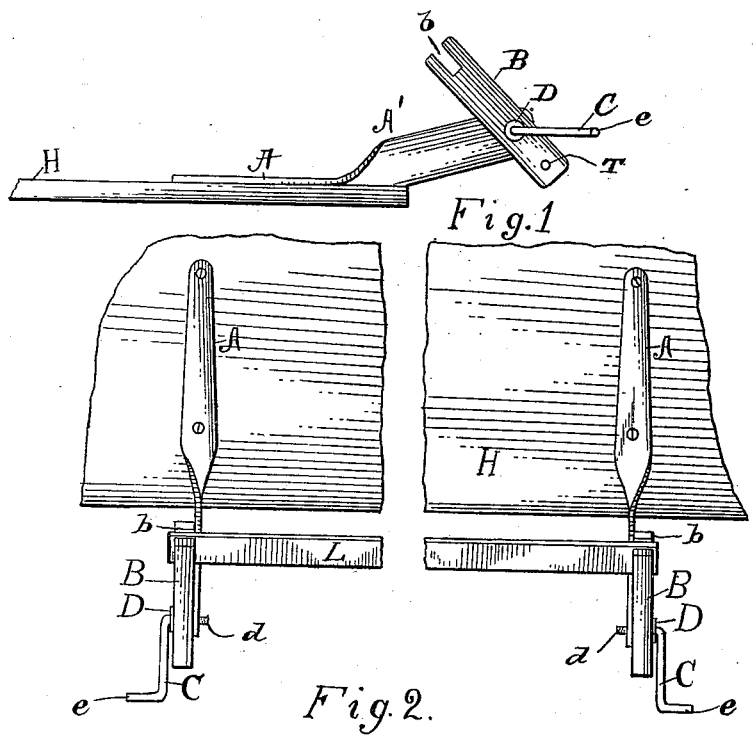
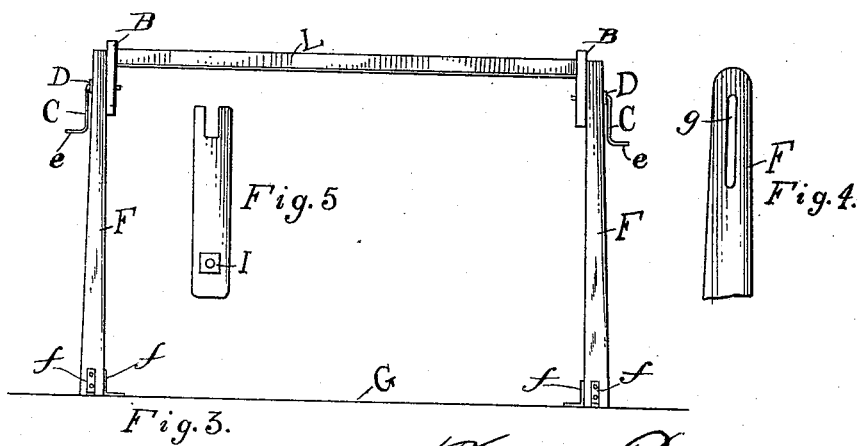
WITNESSES: Frank C. Pyre — INVENTOR

United States Patent Office.

FRANK PYRE, OF FULTON, WISCONSIN.

DEVICE FOR SUPPORTING TOBACCO-LATHS.

SPECIFICATION forming part of Letters Patent No. 461,274, dated October 13, 1891.

Application filed November 17, 1890. Serial No. 371,719. (No model.)

*To all whom it may concern:*

Be it known that I, FRANK PYRE, a citizen of the United States, residing at Fulton, in the county of Rock and State of Wisconsin, have invented certain new and useful Improvements in Devices for Supporting Tobacco-Laths; and I do hereby declare the following to be a full, clear, and exact description of the invention, such as will enable others skilled in the art to which it appertains to make and use the same.

This invention relates to devices for supporting or holding tobacco-laths while the leaves are being stripped or removed from the plants or stalks strung thereon; and it has for its object to provide a simple, durable, inexpensive device for this purpose, adapted to hold the stalks in the position in which they would naturally be held by the hand of the stripper when stripping in the manner now most commonly employed; and it consists, first, in providing a lath-holder having means for holding the laths in the desired position; secondly, in providing a holder adapted to be adjusted to any desired angle of inclination and to any desired height; third, in providing a holder with means for securing the same in its set position, and, finally, in other details of construction and arrangement, as will be fully hereinafter set forth and claimed.

In the accompanying drawings, forming a part of this specification, Figure 1 is a side elevation of one form of my invention; Fig. 2, a plan view of the same; Fig. 3, a front elevation of another form of the invention, and Figs. 4 and 5 detail views.

Similar letters refer to similar parts throughout the several views.

A represents brackets formed of flat bars of iron, having a twist or turn formed in them about midway their length, so that for the balance of their length they extend upwardly at an acute angle and edgewise to the other half, as at A', Fig. 1, and having formed therein, near the ends of said acutely-extending portions, screw-threaded perforations to receive the screw-threaded ends of cranks C. These brackets are firmly bolted or screwed to a table or bench or other horizontal support H, so that their portions A' will extend beyond the edge of the support, as shown in Fig. 1, and are arranged at any suitable distance apart, the usual distance being from about three and one-half to three and three-fourths or four feet apart.

B represents a flat bar of wood, preferably having formed in one end a slot $b$ and near the other end two or more perforations T, arranged in line with each other, two of such bars being employed in each device, and which will hereinafter be termed "lath-holders."

C represents cranks having screw-threads $d$ formed at one end, and handles $e$ at the other, said screw-threaded ends being passed through one of the perforations T and into the screw-threaded perforations formed in the portions A' of the brackets, a washer D being interposed between the arms of the cranks and the lath-holding arms to prevent injury to the material of the latter as well as to cause the cranks to stand off from the lath-holding arms, so that they may be turned freely without interfering with said arms.

From the above description it will be readily seen that the lath-holding arms B may be set at any desired angle of inclination relative to the brackets, and so held by the cranks C, the threaded ends of which are passed through one of the perforations T in the lath-holding arms and screwed into the threaded perforations formed in the brackets, thus clamping the said arms rigidly against the brackets and holding them securely in their adjusted position, and said arms may also be adjusted vertically by means of the perforations T therein.

L represents a lath set edgewise in the slots $b$ of the lath-holding arms, so as to assume and be held at the same angle of inclination as that of the lath-holding arms. On this lath the tobacco plants or stalks are strung in the usual or any desired manner, and when the lath is placed in the slots $b$ of the arms the plants or stalks will be held or project from the lath at an angle corresponding to the angle of the lath and its arms. Thus it will be observed that both of the hands of the stripper are left free for use in removing the leaves from the plants or stalks and that the latter will be held in such a position that the leaves may be readily selected therefrom in stripping, thus enabling the stripper to assort the leaves as he removes them from the stalks and obviating the necessity for a second handling of the leaves, which is always objectionable because of the liability attending the same of injuring or damaging the leaves, which, as well known, are very brittle when dry and liable to break or crumble from frequent handling.

In Fig. 3 I show the lath-holding arms attached to uprights or standards F instead of the brackets A, secured at one end to the floor G of a barn or house by means of angle-irons or feet $f$, screwed or bolted to the lower ends of the standards and to the floor. These standards are set at a suitable distance apart and have elongated slots $g$ formed in them near their upper ends, through which the screw-threaded ends of the cranks C pass and into nuts I, sunk in the material of the lath-holding arms, as shown in Fig. 5, whereby the arms may be drawn up tightly against the standards, and thus held in whatever position they are set, and they may also be adjusted vertically to any desired height within the compass of the elongated slots $g$ of the standards. (See Fig. 4.)

It is evident from the above description of my invention that a stripper using this device can work to the best possible advantage and strip more expeditiously than he otherwise could, as the plants are not only firmly held by the device independently of the stripper, but they are also held in the position in which he would naturally hold them if holding them by hand, as is commonly practiced, after removal from the laths to strip them. Besides, they are held up before the stripper, so that he is able to select the leaves to be removed, and thus assort them as he removes them from the stalks.

As it is evident that the devices herein described may be modified in many ways to accomplish the object of my invention without involving a departure from the spirit thereof, I do not therefore desire to be limited to the exact construction and arrangement herein set forth.

Having thus described my invention, what I claim as new, and desire to secure by Letters Patent, is—

1. The combination, with suitable supports, of tobacco-lath-holding devices secured to said supports and means whereby the said holding devices may be adjusted to any desired angle of inclination thereon, substantially as described.

2. The combination, with suitable supports, of tobacco-lath-holding devices pivoted to said supports, whereby adjustment in an arc of a circle may be had, and means for adjusting the said holding devices in the direction of their length, substantially as described.

3. The combination, with suitable supports, of lath-holding arms having slots formed at one end, a lath fitting said slots, and means for adjustably securing said arms to the supports, substantially as described.

4. The combination, with suitable supports, of the lath-holding arms having slots at one end, means for clamping said arms to said supports at any desired angle of inclination, and a lath fitting said slots, substantially as described.

5. The combination, with suitable supports, of the lath-holding arms having slots at one end and perforations at the other end, and the cranks having screw-threaded ends adapted to secure said holding-arms to said supports, substantially as described.

6. The combination, with the supporting-brackets having screw-threaded perforations formed therein, of the lath-holding arms having slots at one end, and cranks having screw-threaded ends adapted to secure said arms to said brackets, substantially as described.

FRANK PYRE.

Witnesses:
D. F. SAYRE, Jr.,
DAVID F. SAYRE.